US012692937B1

(12) United States Patent (10) Patent No.: US 12,692,937 B1
Chan et al. (45) Date of Patent: Jul. 28, 2026

(54) PAN-TILT DEVICE THAT REDUCES BACKLASH EFFECTS

(71) Applicant: Amazon Technologies, Inc., Seattle, WA (US)

(72) Inventors: Chia-Wei Chan, Taipei (TW); Chia-Wei Chen, Taipei (TW); Matthew J. England, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 18/614,417

(22) Filed: Mar. 22, 2024

(51) Int. Cl.
F16H 57/12 (2006.01)
F16M 11/20 (2006.01)
G03B 17/56 (2021.01)

(52) U.S. Cl.
CPC ......... F16H 57/12 (2013.01); F16M 11/2064 (2013.01); G03B 17/561 (2013.01); F16H 2057/127 (2013.01)

(58) Field of Classification Search
None
See application file for complete search history.

(56) References Cited

U.S. PATENT DOCUMENTS

| | | | |
|---|---|---|---|
| 6,203,216 B1* | 3/2001 | Koizumi | F16M 11/10 |
| | | | 396/428 |
| 2001/0008597 A1* | 7/2001 | Iimura | B41J 13/0045 |
| | | | 400/641 |
| 2022/0146913 A1* | 5/2022 | Oe | G03B 17/561 |

FOREIGN PATENT DOCUMENTS

JP 2001074126 A * 3/2001

* cited by examiner

*Primary Examiner* — Rodney E Fuller
(74) *Attorney, Agent, or Firm* — Eversheds Sutherland (US) LLP

(57) ABSTRACT

An apparatus includes a motor having one or more gears and a shaft operably coupled to the one or more gears. The shaft actuates to adjust a field of view (FoV) of a camera. The apparatus further includes a bracket having a passage in which the shaft is at least partially disposed, and a channel. A spring is at least partially disposed with the channel of the bracket and is configured to reduce a backlash within the one or more gears of the motor.

20 Claims, 18 Drawing Sheets

PAN-TILT DEVICE THAT REDUCES BACKLASH EFFECTS

BACKGROUND

Security is a concern for many homeowners, businesses, and the like. In some examples, those seeking to protect or monitor their homes or place of business may wish to have video and/or audio communications. Devices, for example, may be placed adjacent to an external door, entryway, and the like. However, conventional devices may have limited fields of view within the environment. In some examples, mounts may be used to increase a field of view of the device. Conventional mounts, however, may be difficult to control and/or have jarring movements.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIGS. 2A-2C illustrate various views of the device and the stand of FIG. 1, according to examples of the present disclosure.

DETAILED DESCRIPTION

Figure 1:
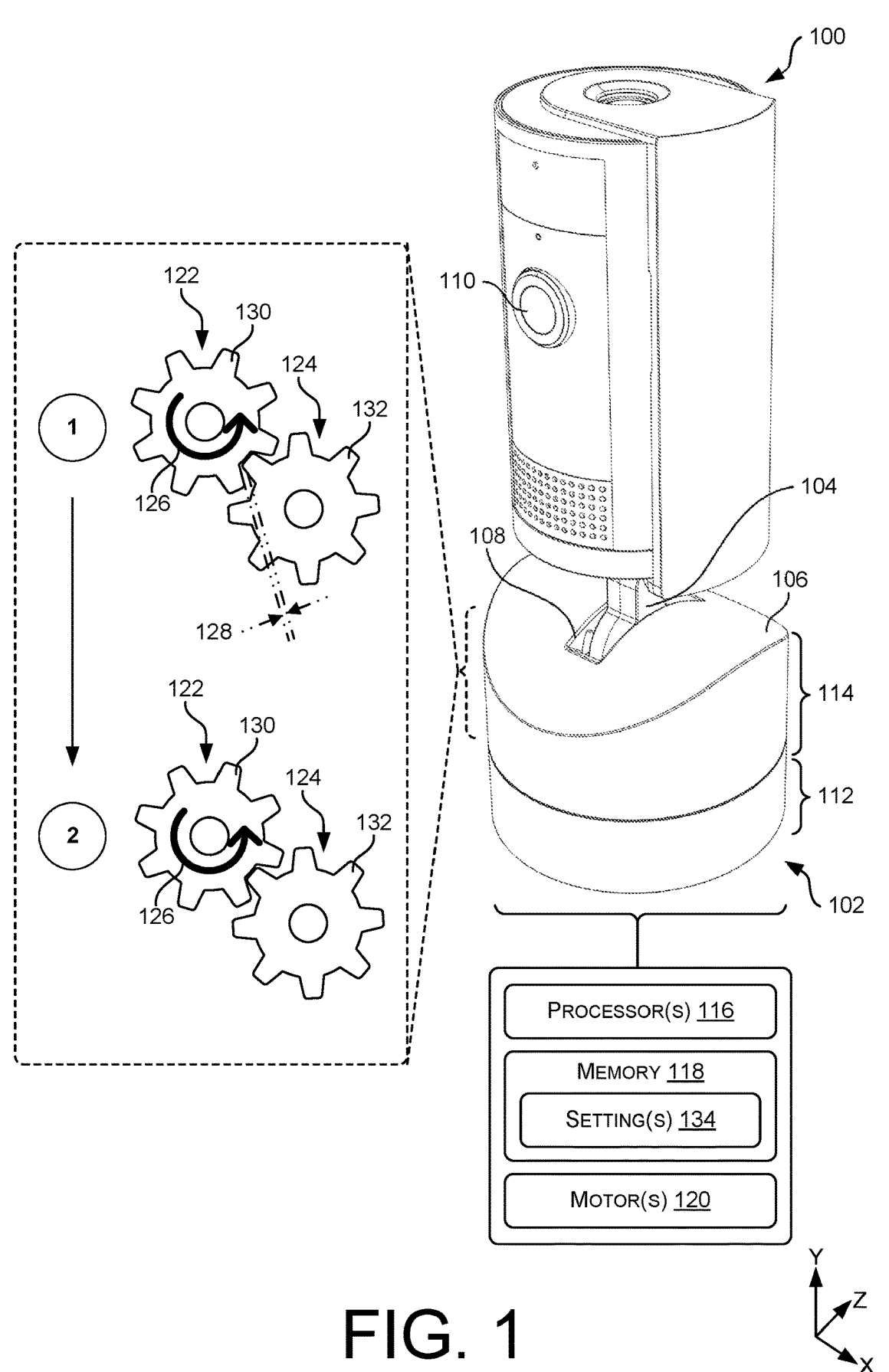
FIG. 1 illustrates an example device and an example stand having one or more motors for adjusting a field of view (FoV) of one or more sensor(s) of the device, according to examples of the present disclosure.

This application is directed, at least in part, to a stand (e.g., device, apparatus, etc.) configured to adjust a field of view (FoV) of one or more sensors of a device (e.g., electronic device, A/V device, security camera, computing component, etc.), according to examples of the present disclosure. In some instances, the stand may rest or be disposed on a surface within the environment. The device may be coupled to the stand, and the stand may be actuatable in one or more directions to adjust an orientation of the device. Adjusting the orientation of the device correspondingly adjusts the FoV. In some instances, the stand may be actuatable about one or more axes to adjust the FoV, or statedly alternatively, the stand may move the device about one or more degrees of freedom. For example, the stand may include one or more motor(s) that adjust a pan and/or tilt of the device. Furthermore, the stand may include a spring that reduces, or eliminates, backlash within the one or more motors during actuation. Reducing or eliminating backlash may increase user experiences and lead to less noise, vibration, and/or wear.

In some instances, the stand may include a first portion (e.g., base, bottom half, section, housing, etc.) and a second portion (e.g., top, top half, section, housing, etc.). The first portion and the second portion may rotate relative to one another for adjusting a pan of the device (e.g., side to side). For example, the first portion and the second portion may rotate about a first axis (e.g., Y-axis) for adjusting pan. In some instances, the first portion may be stationary, disposed on, and/or coupled to a surface within the environment, such as a horizontal surface (e.g., shelf) or a vertical surface (e.g., wall). Additionally, the stand may include a neck (e.g., bracket, mount, coupler, etc.) that couples to the device. The neck may be at least partially received within a slot defined by a cover of the first portion. For example, the neck may protrude from the slot for coupling to the device. The neck may be configured to move (e.g., translate) within the slot for adjusting the tilt of the device (e.g., front and back). For example, the neck may rotate about a second axis (e.g., X-axis) for adjusting tilt. The stand may be weighted, or include sufficient weight, to support or stabilize movement of the device during panning and tilting.

The stand may include a first motor for adjusting the pan of the device and a second motor for adjusting the tilt of the device. In some instances, a user may interact with the device to control the first motor and the second motor. For example, the user may communicatively couple to the device, the stand, etc. for actuating the first motor and the second motor. As an example, if the user desires to change a FoV of the sensors, the user may cause the first motor and/or the second motor to be actuated (e.g., via transmitted signals).

In some instances, the first motor and the second motor are disposed in the first portion of the stand. Actuation of the first motor may cause the second portion to rotate relative to the first portion, and actuation of the second motor may cause the neck to rotate and move within the slot. The first motor and the second motor may represent brushless DC motors, servo motors, etc. The first motor and the second motor may be powered via a battery of the device, and/or the stand, or may be mains powered.

The first motor and/or the second motor may include one or more internal gears, or interact with one or more gears, to control movement of the device. In some instances, the first motor and/or the second motor may include a shaft that transfers motion to components of the stand (e.g., the first portion and the neck) for adjusting the pan and tilt, respectively. Any number of gears may be included to impart motion, and the gears may represent any type of gear (e.g., spur, helical, worn, planetary, etc.).

The gears may be designed with a certain level of backlash to allow for thermal expansion, manufacturing process, lubrication, movement, etc. Backlash is an amount of clearance, slack, play, etc. between mating teeth of two gears. If the backlash is too small, motors may bind and gears may prematurely wear. Additionally, if the backlash is too large, delays are introduced, vibration or noise is imparted to the motor and/or the gears, and/or errors in position may be experienced. While a certain amount of backlash is necessary to permit operation of the motor and/or gears, the stand may include one or more springs that account for, take up, or prevent backlash. For example, the spring may urge teeth of the gears together to keep the gears in contact with one another when the motor(s) are not actuated or driving the gears. When the motor is actuated and motion is imparted into the gears, because teeth are already in engagement with one another (via urging of the spring), the gears may not slip. As the user, for example, adjust the FoV, the stand may seamlessly move the device. In some instances, reducing, or eliminating, the backlash may lead to better quality image data captured via the sensors.

In some instances, the springs may reduce backlash associated the second motor. For example, because the second motor adjusts a tilt of the device, the second motor may have a tendency to experience backlash (e.g., from gravity). However, the spring is configured to bias gears of the second motor into engagement to reduce or eliminate the backlash. In some instances, the spring represents a torsion spring engaged with the motor, or a housing thereof, and a bracket that couples to a shaft of the motor. For example, the bracket may couple to the shaft of the motor (e.g., via a fastener) and the bracket may couple to the neck. However, although the bracket and the neck are described as separate components, the bracket and the neck may be integrated within a single component.

In some instances, the spring is a torsion spring. In some instances, the spring includes a first end (e.g., first leg) coupled to the housing of the motor, and a second end (e.g., second leg) that is received within a channel of the bracket. The housing may include a hole in which the first end of the spring is disposed. Additionally, a loop in the spring may be disposed around a flange of the housing. The engagement of the loop around the flange may prevent the first end reorienting, moving, etc. during winding and unwinding of the spring.

One or more coils of the spring may be disposed between the first end and the second end, where at least some of the coils are received within the channel of the bracket. The first end may represent a stationary end of the spring, while the second end may represent a rotating end that moves with the bracket during actuation of the second motor. For example, the second end may be disposed within a notch of the bracket such that during rotation of the bracket, energy is imparted into the spring During movement of the second end, the spring may store energy. However, when movement of the second motor stops, the spring may exert a torque or twisting force on the bracket, which is in turn coupled to the second motor, to reduce or eliminate the backlash in the gears of the second motor. As the second motor is actuated, the housing may remain stationary and potential energy may be imparted into the spring. However, the second motor may be non-backdrivable such that the device maintains position when the second motor is no longer actuated.

The spring is configured to exert a force in a direction opposite to a winding direction. For example, when the second motor is actuated in a first direction, for example, in a clockwise direction about a rotational axis of the shaft to tilt the device in a first rotational direction (e.g., forward), the spring may be wound. Winding the torsion spring may cause the spring to exert a first force in a direction opposite the first rotational direction. During operation of the second motor in the first direction, the second motor may overcome forces exerted by the spring to tilt the device forward (i.e., thereby imparting potential energy). Conversely, when the second motor is actuated in a second direction, for example, in a counterclockwise direction about the rotational axis of the shaft to tilt the device in a second rotational direction (e.g., backward), the spring may be unwound. Unwinding the spring may cause the spring to exert a second force in a direction opposite the second rotational direction. In other words, rotation of the shaft in a first direction via actuation of the second motor causes the spring to generate a first force in a second direction that is opposite the first direction, and rotation of the shaft in a third direction via actuation of the second motor causes the spring to generate a second force in a fourth direction that is opposite the second direction. During operation of the second motor in the second direction, the second motor may overcome forces exerted by the spring to tilt the camera backward (i.e., thereby imparting potential energy).

Although the spring is described as reducing a backlash associated with the second motor, a spring may be included to reduce or eliminate backlash associated with the first motor. Additionally, although the spring is described as a torsion spring, other springs may be used to reduce or eliminate backlash. Moreover, although described as a spring, other biasing members, such as a pneumatic cylinder may be used.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example device 100 and an example stand 102, according to examples of the present disclosure. In some instances, the device 100 may be coupled to the stand 102 via a neck 104. For example, the stand 102 may include a cover 106 disposed over components of the device 100, where the cover 106 may define a slot 108 (e.g., channel, passageway, etc.). The neck 104, as shown, is at last partially disposed within the slot 108 and protrudes beyond the cover 106 for coupling to the device 100. The neck 104 may represent a mount, coupler, etc. for coupling the device 100 to the stand 102. In some instances, the device 100 and the stand 102 may be referred to herein as an assembly.

The device 100 may include one or more sensors, such as a camera 110, configured to generate image data of an environment. The camera 110 may include a field of view (FoV) within the environment. The stand 102 may be actuatable to adjust the FoV of the camera 110. In some instances, the stand 102 may be configured to move the camera 110 about one or more axes, or stated alternatively, the stand 102 may impart one or more degrees of freedom to the device 100. For example, the stand 102 may be configured to adjust a pan of the camera 110 (e.g., about the Y-axis, side to side, etc.) and/or a tilt of the camera 110 (e.g., about the X-axis, front to back, etc.). Additional details of an example device are described in, for example, U.S. patent application Ser. No. 17/991,638 entitled "Device with Rotatable Privacy Cover," filed Nov. 11, 2022. This patent application, as well as any publications thereof or patents issuing therefrom, are herein incorporated by reference.

In some instances, the stand 102 may include a first portion 112 (e.g., base, bottom half, section, etc.) and a second portion 114 (e.g., top, top half, section, etc.). The first portion 112 and the second portion 114 may rotate relative to one another for adjusting the pan of the device 100. In some instances, the first portion 112 may be stationary, disposed on, and/or coupled to a surface within an environment, such as a horizontal surface (e.g., shelf) or a vertical surface (e.g., wall). The neck may be configured to move (e.g., translate) within the slot 108 for adjusting the tilt of the device 100. In some instances, the stand 102 may be weighted, or include sufficient weight, to support or stabilize panning and tilting of the device 100.

The stand 102 is shown including processor(s) 116 and memory 118, where the processor(s) 116 may perform various functions and operations associated with controlling the stand 102, and the memory 118 may store instructions executable by the processor(s) 116 to perform the operations described herein. For example, the processor(s) 116 may be configured to control one or more motor(s) 120 of the stand 102 for adjusting the FoV of the camera 110. In some instances, the device 100 may include a first motor for adjusting pan and a second motor for adjusting tilt. The first motor and the second motor may include one or more internal gears, or interact with one or more gears, to adjust the pan and/or tilt, respectively. In some instances, the first motor and/or the second motor may include a shaft that transfers motion to components of the stand 102 (e.g., the first portion 112 and the neck 104) for adjusting the pan and tilt. Any number of gears may be included to impart motion, and the gears may represent any type of gear (e.g., spur, helical, worn, planetary, etc.). The motor(s) 120 may represent brushless DC motors, servo motors, etc. The motor(s) 120 may be powered via a battery of the device 100, and/or the stand 102, or may be mains powered.

Gears of the motor(s) 120, or within the stand 102, include a certain amount of backlash to allow for thermal expansion, manufacturing process, lubrication, movement, etc. If the backlash is too small, the motor(s) 120 may bind and gears may prematurely wear. Additionally, if the backlash is too large, delays are introduced, vibration or noise is imparted to the motor(s) 120 and/or the gears, and/or errors in position may be experienced. While a certain amount of backlash is necessary to permit operation of the motor(s) 120 and/or gears, the stand 102 may include one or more springs that account for, take up, or prevent the backlash.

For example, as shown in FIG. 1 at "1", a first gear 122 and a second gear 124 may operably engage with one another. In some instances, the first gear 122 and the second gear 124 may represent gears of the second motor. Although the second motor is described as including two gears, the second motor may include more than two gears. Additionally, the first gear 122 and the second gear 124 may be of different or similar sizes, and/or maybe of different or similar types. As illustrated, the first gear 122 may rotate in a direction 126 to impart motion to the second gear 124. However, as illustrated, backlash 128 exists between two surfaces of the first gear 122 and the second gear 124. For example, the backlash 128 may exist between a surface of first teeth 130 of the first gear 122 and a surface of second teeth 132 of the second gear 124. During rotation in the direction 126, the first gear 122 may have to rotate by an amount corresponding to the backlash 128 in order to impart motion to the second gear 124. As a result of this backlash 128, however, motion is often delayed and/or motion may be jarring, jittery, jerky, etc. one the first teeth 130 engages with the second teeth 132. Such movement may impact a quality of image data captured by the camera 110, for example.

According to aspects of the present disclosure, a spring may be used to reduce, or eliminate the backlash 128. For example, as shown in FIG. 1 at "2", the backlash 128 may be reduced or eliminated. A spring, for example, may reduce or eliminate the backlash 128. The spring may represent a torsion spring that exerts torque or twisting force when wound or unwound. The spring is configured to exert a force in a direction opposite to a winding direction. When motion is imparted to the first gear 122, because the first teeth 130 and the second teeth 132 are already engaged (i.e., via urging of the spring), motion of the device 100 may be seamless and smooth.

As will be discussed herein, the spring may be wound about a bracket that is used to couple the second motor to the neck 104. For example, the bracket may couple to the shaft of the second motor and the bracket may be coupled to the neck 104. In doing so, the spring may exert the force on the neck 104, which is transferred to the bracket, and subsequently the second motor to reduce, or eliminate, the backlash 128. Additionally, as will be discussed herein, the second motor may tilt the device 100 in either a forward direction or a backward direction. In either case, the spring may exert a force to reduce the backlash 128 while being wound or unwound, respectively.

Although FIG. 1 illustrates a certain number, type, size, teeth, etc. of the first gear 122 and the second gear 124, such illustration is merely illustrative. The second motor, for example, may include more than two gears, may include gears of different sizes, types, and teeth, etc. Additionally, in some instances, although described in use with the second motor, a spring may be used to control backlash in the first motor.

In some instances, the stand 102 may be controlled to actuate the motor(s) 120 via input from a user. For example, a user of the device 100 may interact with a mobile phone, tablet, computer, or other similar electronic device, to at least partially control operation of the device 100 and/or the stand 102. In some instances, the device 100 and/or the stand 102 may include network interface(s) (e.g., Wi-Fi, Cellular, Bluetooth, etc.) for communicatively coupling with the electronic device of the user. In some instances, the user may communicate with the device 100 for adjusting pan and/or tilt, and the device 100 may communicate with the stand 102 for causing the pan and/or tilt to be adjusted. Additionally, or alternatively, in some instances, the user may communicate with the stand 102 directly for causing the pan and/or tilt to be adjusted. One or more cables, interfaces, flex circuits, PCBs, PCBAs may communicatively coupling the device 100 and the stand 102. For example, cables may route within the neck 104, between the device 100 and the stand 102 to transfer power, exchange data, signals, and so forth.

The memory 118 is shown storing, or having access to, setting(s) 134. In some instances, the setting(s) 134 are associated with an amount of actuation by the motor(s) 120, a degree of movement of the motor(s) 120, a current position or state of the motor(s) 120, a limit of the motor(s) 120, and so forth. For example, as the motor(s) 120 pan and tilt, the setting(s) 134 may indicate a current position of the motor(s) 120, a remining degree of movement of the motor(s) 120, and so forth.

Although certain components of the device 100 and/or the stand 102 are described, the device 100 and the stand 102 may include additional components. For example, the device 100 and/or the stand 102 may include battery(ies) for powering components of the device 100 and the stand 102.

As an additional example, the stand 102 may include various PCBs, PCBAs, etc. for controlling an operation of the stand 102.

As used herein, a processor, such as the processor(s) 116 may include multiple processors and/or a processor having multiple cores. Further, the processor(s) 116 may comprise one or more cores of different types. For example, the processor(s) 116 may include application processor units, graphic processing units, and so forth. In one implementation, the processor(s) 116 may comprise a microcontroller and/or a microprocessor. The processor(s) 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 116 may possess its own local memory, which also may store program components, program data, and/or one or more operating systems.

Memory, such as the memory 118, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 116. The memory 118 is an example of non-transitory computer-readable media. The memory 118 may include one or more non-transitory computer-readable media storing computer-executable instructions that, when executed by the processor(s) 116, cause the processor(s) 116 to perform acts. The memory 118 may store an operating system and one or more software applications, instructions, programs, and/or data to implement the methods described herein and the functions attributed to the various systems.

Figure 2A:
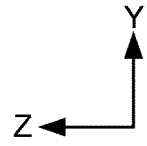
Figure 2B:
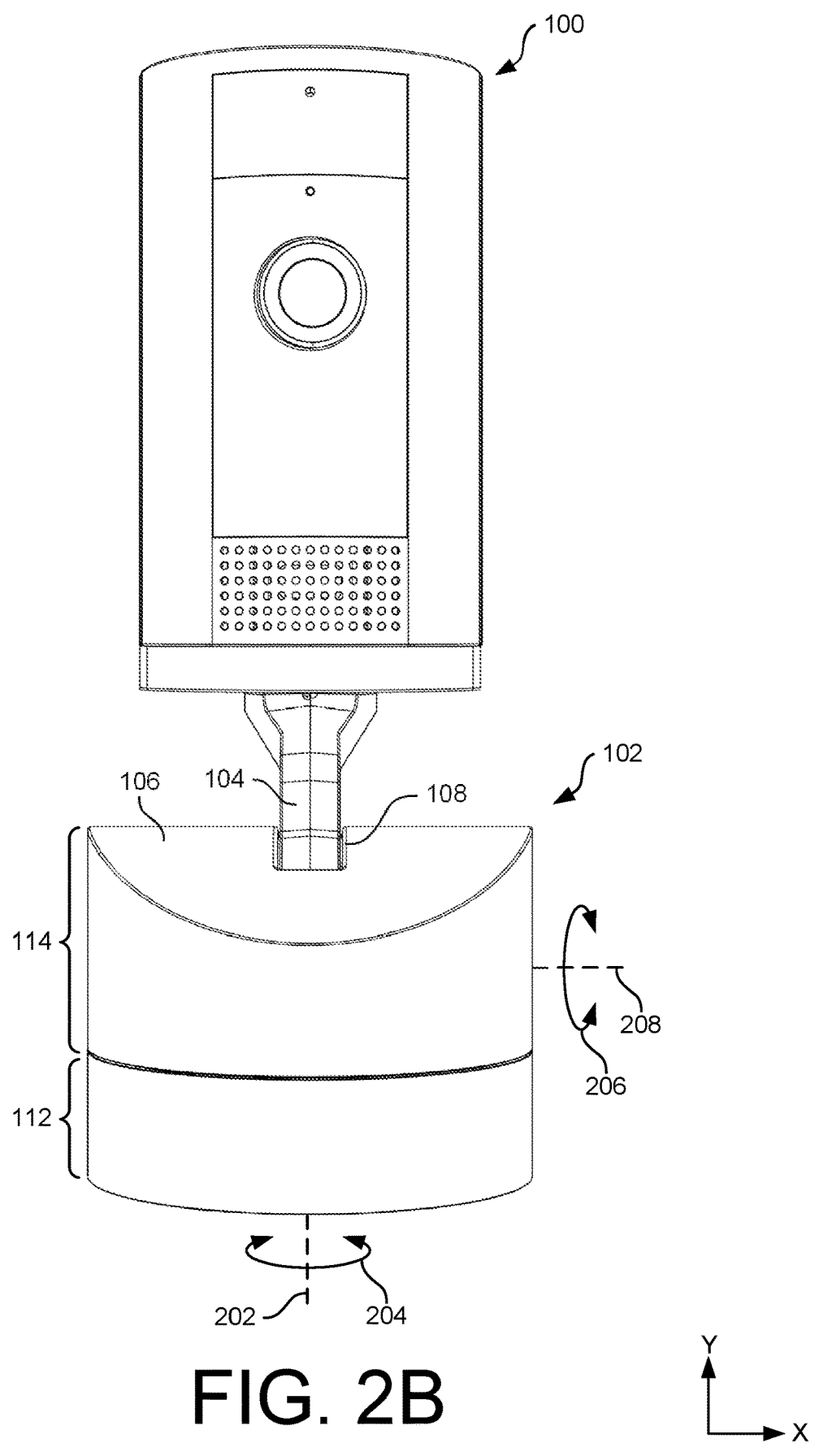
Figure 2C:
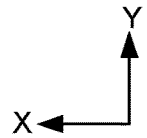

FIGS. 2A-2C illustrate various side views of the device 100 and the stand 102, according to examples of the present disclosure. For example, FIG. 2A may illustrate a first side view of the device 100 and the stand 102 (e.g., left side view), FIG. 2B may illustrate a second side view of the device 100 and the stand 102 (e.g., front view), and FIG. 2C may illustrate a third side view of the device 100 and the stand 102 (e.g., back view).

The device 100 may couple to the stand 102 via the neck 104, which is at least partially received within the slot 108 of the cover 106. In some instances, the neck 104 includes a cap 210 disposed over cables, for example, that connect computing components disposed in the device 100 to computing components within the stand 102. The stand 102, such as the first portion 112 of the stand 102, may include a port 200 for receiving power, communicatively coupling the device 100 and/or the stand 102 to a network, and so forth. For example, the port 200 may represent a USB-C port, auxiliary port, etc. As will be discussed herein, the cover 106 may be disposed over components of the stand 102, such as the motor(s) 120.

The stand 102 may have a central vertical axis 202, where actuation of the first motor may pan the about the central vertical axis 202 in a first rotational direction 204. During panning, the first portion 112 of the stand 102 may remain stationary (e.g., on a surface in which the stand 102 is disposed) while the second portion 114 of the stand 102 may rotate about the central vertical axis 202. Given the coupling of the device 100 to the second portion 114 of the stand 102 (i.e., via the neck 104), the device 100 may correspondingly rotate about the central vertical axis 202. The stand 102 may pan in both a clockwise and counterclockwise direction about the central vertical axis 202.

In some instances, the stand 102 as illustrated in FIGS. 2A-2C may rotate in either the clockwise direction or counterclockwise direction about the central vertical axis 202 (e.g., Y-axis). For example, a position of the stand 102 as shown in FIGS. 2A-2C may be central. From the central position, the stand 102 may be rotated in either the clockwise direction or counterclockwise direction about the central vertical axis 202. In some instances, the stand 102 may have a degree of travel (or rotation) from the central position in either the clockwise direction or counterclockwise direction about the central vertical axis 202. For example, the stand 102 may rotate 90 degrees, 100 degrees, etc. in either the clockwise direction or counterclockwise direction about the central vertical axis 202. In some instances, the stand 102 may have a 360 degree movement about the central vertical axis 202.

Beneath the cover 106, the neck 104 may couple to the second motor via a bracket. The second motor may actuate to tilt the device 100 in a second rotational direction 206. During tilting, the neck 104 may move within the slot 108 of the cover 106. As such, the slot 108 may accommodate the tilt of the device 100. As will be explained herein, the actuation of the second motor may tilt about a rotational axis 208 of a shaft of the second motor in the second rotational direction 206. The device 100 may tilt in both a clockwise and counterclockwise direction about the rotational axis 208 (e.g., X-axis).

In some instances, the device 100 as illustrated in FIGS. 2A-2C may rotate in either the clockwise direction or counterclockwise direction about the rotational axis 208. For example, a position of the device 100 as shown in FIGS. 2A-2C may have a vertical upright position. From the vertical upright position, the stand 102 may tilt in either the clockwise direction or counterclockwise direction about the rotational axis 208. In some instances, the stand 102 may have a degree of travel (or rotation) from the vertical upright position in either the clockwise direction or counterclockwise direction about the rotational axis 208. For example, the stand 102 may rotate 30 degrees, 45 degrees, etc. in either the clockwise direction or counterclockwise direction about the rotational axis 208.

Figure 3A:
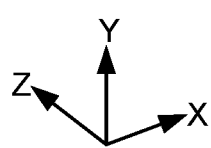
FIGS. 3A and 3B illustrate example components of the stand of FIG. 1, according to examples of the present disclosure.
Figure 3B:
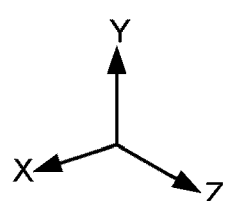

FIGS. 3A and 3B illustrate details of the stand 102, according to examples of the present disclosure. In FIGS.

3A and 3B, the cover 106 is shown removed, and the device 100 is shown uncoupled from the stand 102.

The stand 102 includes a first motor 120(1) for adjusting, or controlling, pan (e.g., about the Y-axis, central vertical axis 202, etc.) and a second motor 120(2) for adjusting, or controlling, tilt (e.g., about the X-axis, the rotational axis 208, etc.). The first motor 120(1) and the second motor 120(2) may be disposed within, on, etc. the second portion 114, beneath the cover 106. The first motor 120(1) operably couples to the first portion 112 such that during actuation of the first motor 120(1), the second portion 114 of the stand 102 rotates. For example, as will be explained herein, the first motor 120(1) may engage with gears, levers, arms, etc. disposed within the first portion 112 for rotating the second portion 114.

The second motor 120(2) couples to the neck 104 via a bracket 300. For example, the bracket 300 may couple to a shaft of the second motor 120(2), and the bracket 300 may couple to the neck 104. As such, during actuation of the second motor 120(2), motion may be transferred to the neck 104, and correspondingly the device 100. The neck 104 may include a first end 302 that couples to the bracket 300, and a second end 304 that couples to the device 100. For example, the second end 304 may include a receptacle 306 into which the device 100 is secured or otherwise coupled. However, although the bracket 300 and the neck 104 are described as separate components, the bracket 300 and the neck 104 may be integrated within a single component.

In some instances, the first motor 120(1) may be oriented in a first orientation, direction, etc. and the second motor 120(2) may be oriented in a second orientation, direction, etc. The first orientation, direction, etc. may be orthogonal to the second orientation, direction, etc. For example, the first motor 120(1) may have a shaft that rotates about a rotational axis 308, while the second motor 120(2), as discussed above, has a shaft that rotates about the rotational axis 208. The rotational axis 308 (e.g., about the Y-axis) may be orthogonal to the rotational axis 208 (e.g., about the X-axis).

The stand 102 may include a frame 312, for example, to which components of the stand 102 couple (e.g., the motor(s) 120). The stand 102 may also include a PCB 310. The PCB 310 may be disposed at a location between the first motor 120(1) and the second motor 120(2). The PCB 310 may include a cutout, notch, etc. in which the bracket 300 is at least partially disposed, where the cutout accommodates the bracket 300. The PCB 310 may include components for controlling an operation of the stand 102 (e.g., the processor(s) 116, the memory 118, resistor(s), capacitors, interface(s), etc.). The PCB 310 may communicatively couple to the device 100, for example, via cables routed at least partially through the neck 104. The PCB 310 may also communicatively couple to components in the stand 102, for example, the motor(s) 120, via flex circuits, wires, cables, etc. Additionally, the PCB 310 may communicatively couple to the port 200, for example, to receive power, signals, etc.

Figure 4:
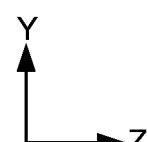
FIG. 4 illustrates example components of the stand of FIG. 1, according to examples of the present disclosure.

FIG. 4 illustrates details of the stand 102, according to examples of the present disclosure. In FIG. 4, the first motor 120(1) is shown removed. As will be explained herein, the second motor 120(2), such as a shaft of the second motor (2) may couple to the bracket 300 via a fastener 400. For example, the bracket 300 may include a passage (e.g., hub) through which the shaft of the second motor 120(2) is disposed, and the fastener 400 may be coupled to the shaft within the passage to couple to bracket 300 to the shaft. Additionally, the neck 104, such as the first end 302 of the neck 104, may couple to the bracket 300. In some instances, the neck 104 may couple to the bracket 300 via fasteners, snap-fit, pressure-fits, etc.

The PCB 310 is also shown including a cutout 402 or accommodating the bracket 300 and/or the neck 104. The cutout 402 may be sized and shaped to permit tilting of the device 100.

Figures 5A, 5B:
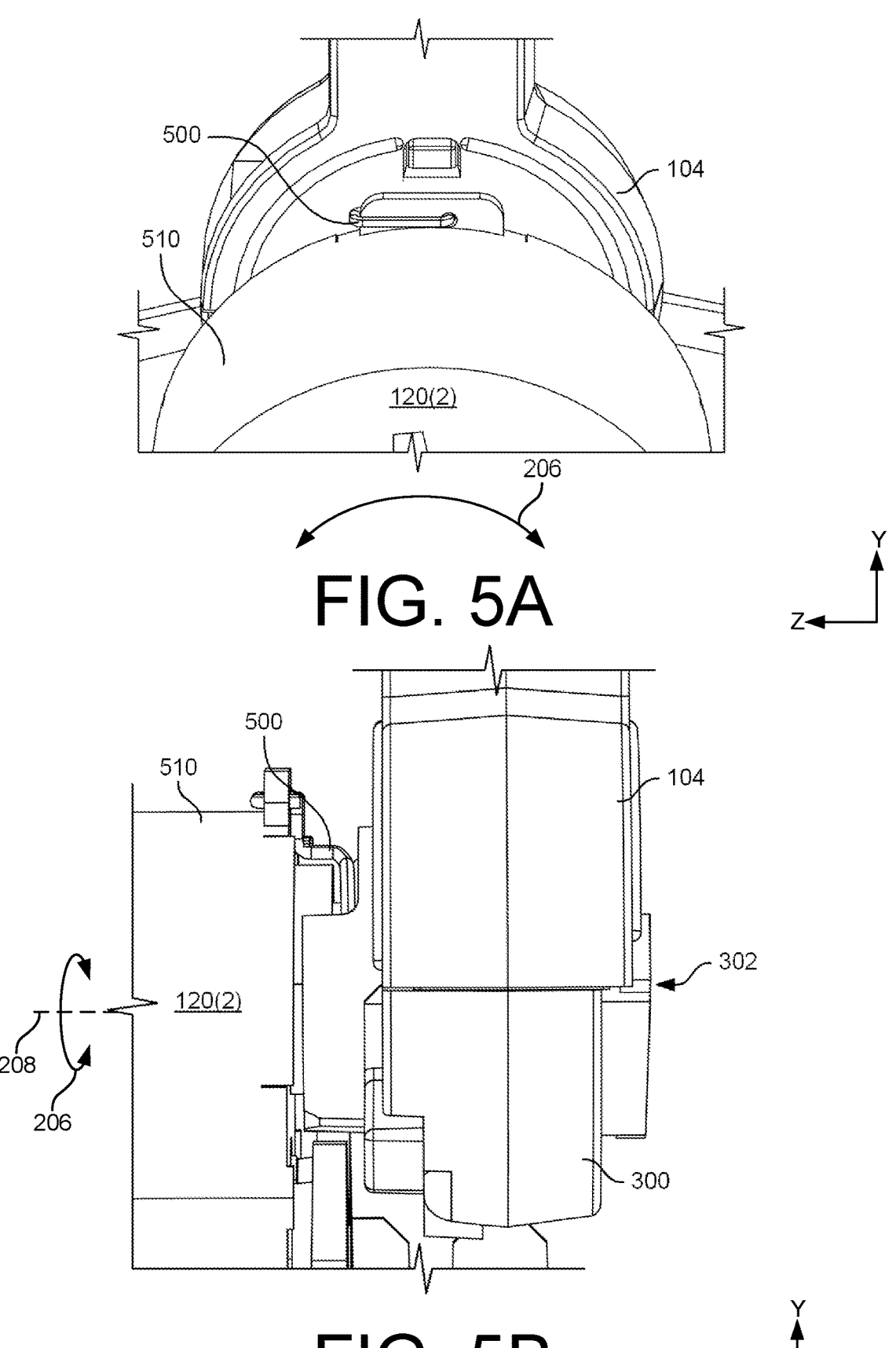
FIGS. 5A-5E illustrate example components of the stand of FIG. 1 for adjusting the FoV of the one or more sensor(s), according to examples of the present disclosure.
Figure 5C:
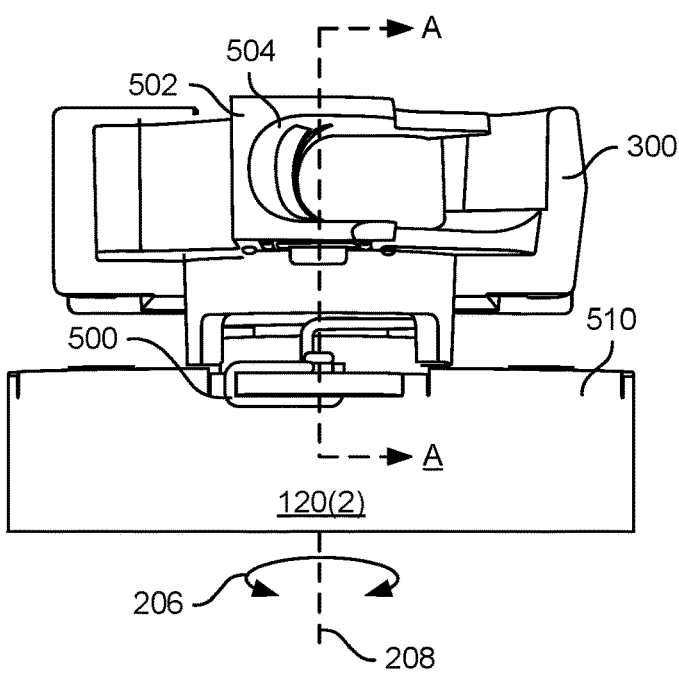
Figure 5D:
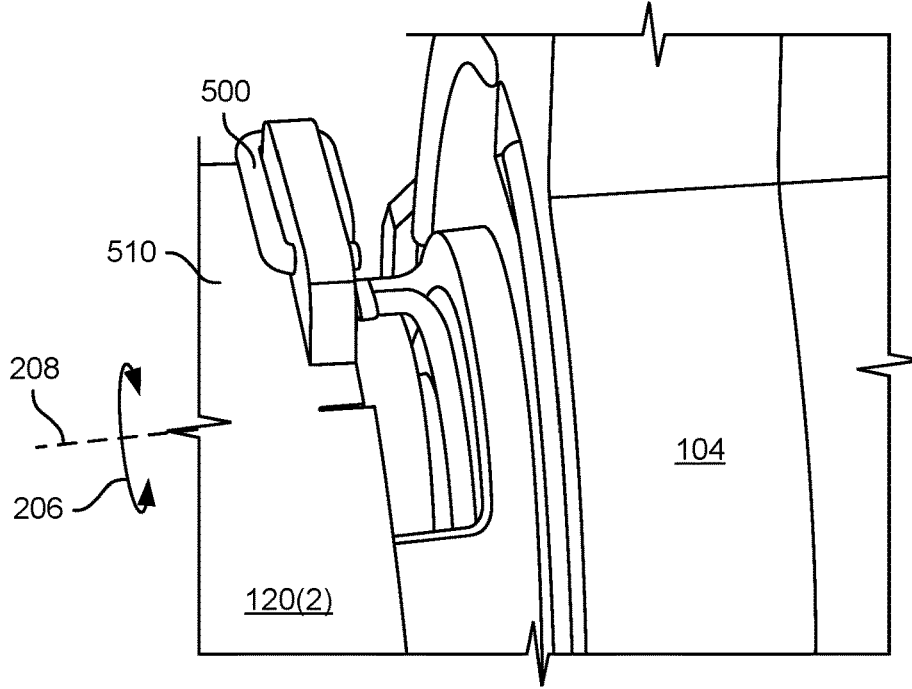
Figure 5E:
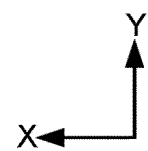

FIGS. 5A-5E illustrate various views showing an engagement between the neck 104, the bracket 300, the second motor 120(2), and a spring 500 that reduces, or eliminates, backlash within the second motor 120(2), according to examples of the present disclosure. FIG. 5E illustrates a cross-sectional view taken along line A-A of FIG. 5C.

As introduced above, the neck 104 couples to the bracket 300, for example, proximate to the first end 302 of the neck 104. In some instances, the bracket 300 may include a post 502 (e.g., collar, neck, etc.) over which the neck 104 is disposed. For example, the first end 302 of the neck 104 may slide over the post 502 to couple the neck to the bracket 300. The post 502 may include a passageway 504 through which cables are routed between the stand 102 and the device 100, for example.

The second motor 120(2) includes a shaft 506 (e.g., hub, etc.) that couples to the bracket 300 via the fastener 400. For example, the bracket 300 may define a passage 508 into which the shaft 506 is at least partially disposed. The passage 508 be irregular shaped such that motion of the shaft 506 is transferred to the bracket 300 without experiencing slippage. The second motor 120(2) may include a housing 510 through which the shaft 506 is disposed.

As discussed above, the stand 102 may include the spring 500 for reducing, or eliminating, backlash within the second motor 120(2). Details of the spring 500 are discussed herein, however, the spring 500 may be at least partially disposed within a channel 512 of the bracket 300. For example, one or more coils of the spring 500 may be disposed within the channel 512. As shown, the spring 500 may be disposed at least partially around the shaft 506. For example, the spring 500 may represent a torsion spring.

The spring 500 may couple to the housing 510 of the second motor 120(2) and the bracket 300. For example, a first end of the spring 500 may represent a stationary end that couples to the housing 510, while a second end of the spring 500 may represent a rotating end that moves with the bracket 300 during actuation of the second motor 120(2). For example, the second end may be disposed within a notch of the bracket 300 such that during rotation of the bracket 300 (e.g., about the rotational axis 208), energy is imparted into the spring 500.

During movement of the second end, the spring 500 may store energy. As the second motor 120(2) is actuated, the housing 510 may remain stationary and potential energy may be imparted into the spring 500. However, when movement of the second motor 120(2) stops, the spring 500 may exert a torque or twisting force on the bracket 300, which is in turn coupled to the second motor 120(2), to reduce or eliminate the backlash in gears of the second motor 120(2). However, the second motor 120(2) may be non-backdrivable such that the device 100 (or rather the bracket 300, neck 104, etc.) maintains position when the second motor 120(2) is no longer actuated.

The spring 500 is configured to exert a force in a direction opposite to a winding or unwinding direction of the spring 500. For example, when the second motor 120(2) is actuated in the second rotational direction 206, for example, in a clockwise direction about the rotational axis of the shaft 506 to tilt the device 100 (e.g., forward), the spring 500 may be wound. Winding the spring 500 may cause the spring 500 to exert a first force in an opposite direction (e.g., counter-clockwise about the rotational axis 208). During operation of the second motor 120(2) in the clockwise direction about the rotational axis 208, the second motor 120(2) may overcome forces exerted by the spring 500 to tilt the device 100 forward (i.e., thereby imparting potential energy). Conversely, when the second motor 120(2) is actuated in a counterclockwise direction about the rotational axis 208 to tilt the device 100 in the second rotational direction 206 (e.g., backward), the spring 500 may be unwound. Unwinding the spring 500 may cause the spring 500 to exert a second force in an opposite direction (e.g., clockwise about the rotational axis 208). During operation of the second motor 120(2) in the counterclockwise direction about the rotational axis 208, the second motor 120(2) may overcome forces exerted by the spring 500 to tilt the device 100 backward (i.e., thereby imparting potential energy).

Figure 6A:
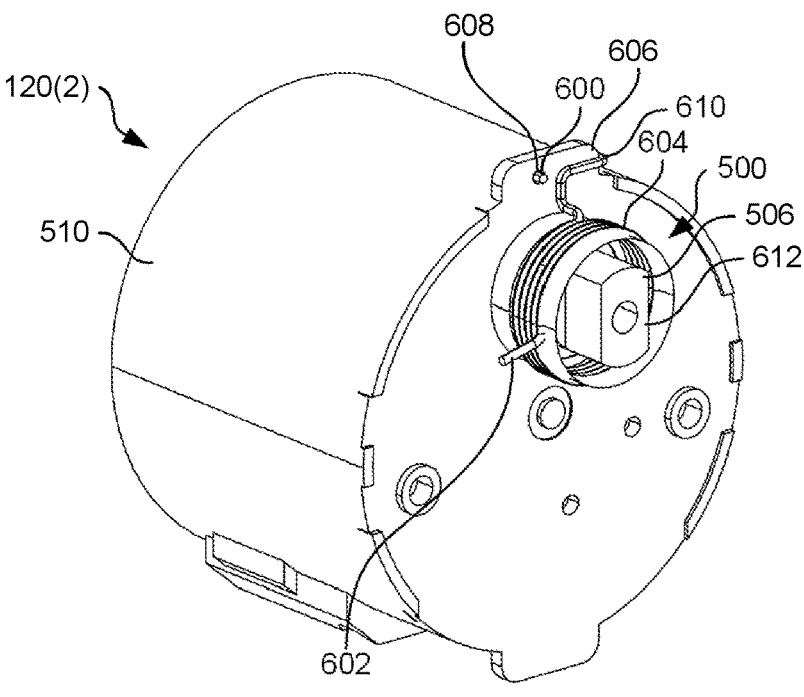
FIGS. 6A and 6B illustrate an example motor and an example spring of the stand, for reducing or eliminating backlash in the motor, according to examples of the present disclosure.
Figure 6A:
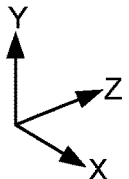
Figure 6B:
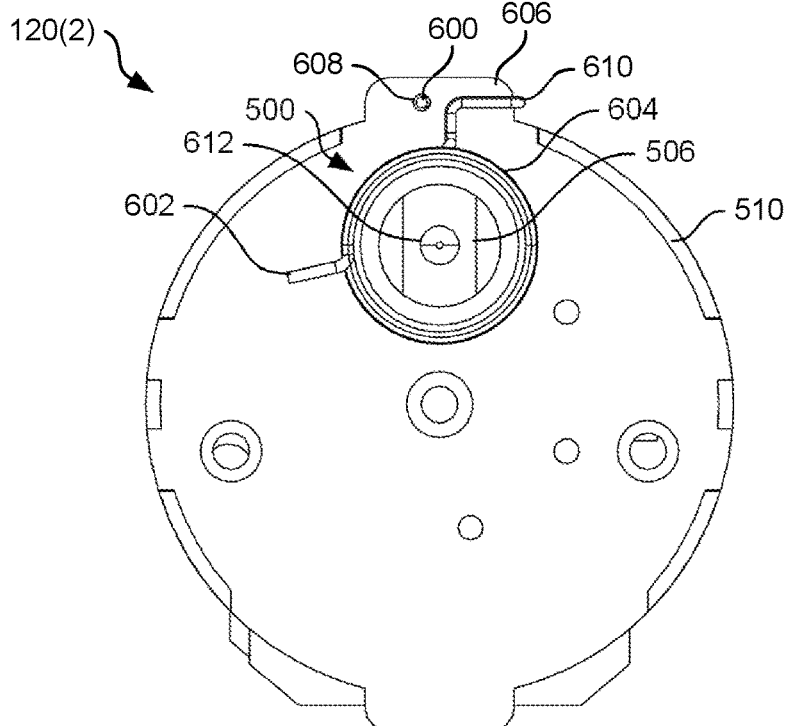
Figure 6B:
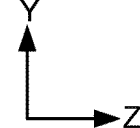

FIGS. 6A and 6B illustrate details of the second motor 120(2), the housing 510, and the spring 500, according to examples of the present disclosure. The spring 500 may include a first end 600 (e.g., first leg) and a second end 602 (e.g., second leg) spaced apart from the first end 600. One or more coils 604 may be disposed between the first end 600 and the second end 602, which may be at least partially received within the channel 512 of the bracket 300. The coils 604 are also disposed around the shaft 506 of the second motor 120(2). The shaft 506 may include an opening 612 for receiving the fastener 400, and for coupling the bracket 300 to the shaft 506. Additionally, at least a portion of the shaft 506 may be keyed, slotted, etc. to prevent slippage between the shaft 506 and the bracket 300 within the passage 508.

The housing 510 may be disposed around components of the second motor 120(2), such as gears of the second motor 120(2). The housing 510 may include a flange 606 that defines a receptacle 608 (e.g., hole, channel, opening, etc.) in which the first end 600 of the spring 500 is at least partially disposed. In addition, the spring 500 may be at least partially disposed around (e.g., wrapped around, curve around, etc.) the flange 606. For example, the spring 500 may include a loop 610 that is at least partially disposed around the flange 606. The loop 610 may be a partial loop, so as to not wrap around an entirety of the flange 606. For example, the loop 610 may only be disposed around one end of the flange 606. In some instances, the loop 610 may represent one or more bends, curves, etc. in the spring 500.

The engagement between the first end 600 and the housing 510, via the receptacle 306, and the engagement between the loop 610 and the flange 606, may secure the spring 500 to the housing 510. During unwinding and winding of the spring 500, such engagement may prevent the spring 500 moving, reorienting, shifting, etc. For example, the first end 600 and the loop 610 may serve to secure the spring 500 to the housing 510, thereby making the first end 600 a stationary end of the spring 500.

The second end 602 may be disposed in a notch of the bracket 300. The positioning of the second end 602 within the notch secures the second end 602 to the bracket 300 to enable the second end 602 to rotate during actuation of the second motor 120(2). In doing so, the second end 602 may be considered a rotating end of the spring 500 to impart energy into the spring 500 during unwinding and winding.

Figure 7A:
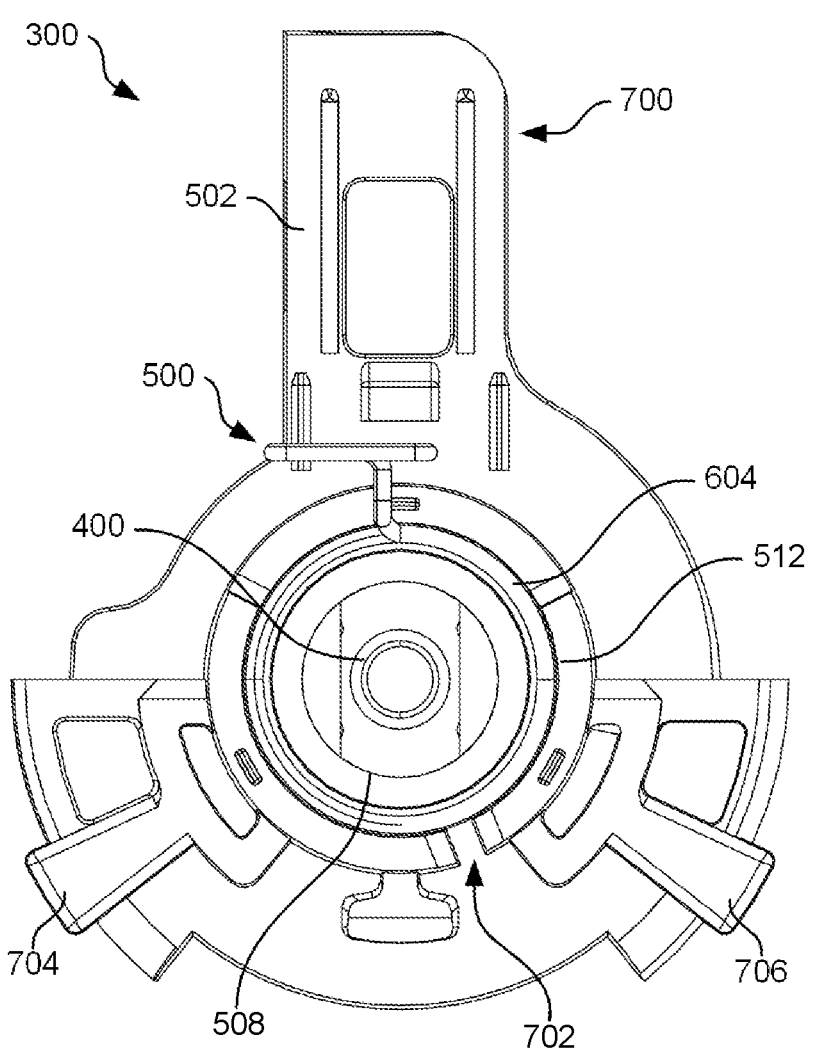
FIGS. 7A-7D illustrate an example bracket configured to couple to the motor of FIGS. 6A and 6B, and which at least partially receives the spring, according to examples of the present disclosure.
Figure 7A:
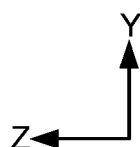
Figure 7B:
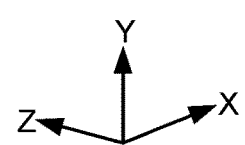
Figure 7C:
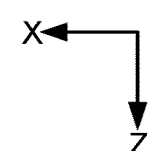
Figure 7D:
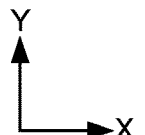

FIGS. 7A-7D illustrate details of an engagement between the bracket 300 and the spring 500, according to examples of the present disclosure. FIG. 7D illustrate a cross-sectional view of the bracket 300 and the spring 500, taken along line B-B of FIG. 7C.

The bracket 300 includes an end 700 that couples to, or receives, the first end 302 of the neck 104. In some instances, the first end 302 of the neck 104 may slide over the end 700 of the bracket 300. The bracket 300 further defines the passage 508 for receiving the shaft 506 of the second motor 120(2), as well as to accommodate the fastener 400 coupling to the shaft 506. The bracket 300 further defines the channel 512 for at least partially receiving the coils 604 of the spring 500. The bracket 300 may also define a notch 702 (e.g., opening, etc.) for receiving the second end 602 of the spring 500. The notch 702 may be communication with the channel 512. When the second end 602 is disposed within the notch 702, rotation of the bracket 300 may corresponding cause rotation (e.g., winding and unwinding) of the spring 500. As such, the disposition of the second end 602 in the notch 702 may transfer movement of the bracket 300 to the spring 500 to impart energy into the spring 500. The first end 600 of the spring 500 extends externally to the channel 512 for engaging with the housing 510.

As the bracket 300 rotates in a clockwise direction about the rotational axis 208, the spring 500 may be wound (e.g., the coils 604 may constrict). When the bracket 300 stops rotating, the spring 500 may exert a force on the bracket 300, and in turn the gears of the second motor 120(2), in a counterclockwise direction about the rotational axis 208. Such force may engage gears of the second motor 120(2) to reduce, or eliminate backlash. Comparatively, as the bracket 300 rotates in a counterclockwise direction about the rotational axis 208, the spring 500 may be unwound (e.g., the coils 604 may expand). When the bracket 300 stops rotating, the spring 500 may exert a force on the bracket 300, and in turn the gears of the second motor 120(2), in a clockwise direction about the rotational axis 208. Such force may engage gears of the second motor 120(2) to reduce, or eliminate backlash.

In some instances, the bracket 300 may include a first stop 704 (e.g., peg, arm, etc.) and a second stop 706 (e.g., peg, arm, etc.) that limit an amount of travel in the second rotational direction 206. For example, the first stop 704 and the second stop 706 may control an amount of tilt permitted of the stand 102. The first stop 704 and the second stop 706 may engage with features (e.g., flanges, stops, etc.) of the cover 106, frame 312, etc. to limit the amount of travel.

Figure 8A:
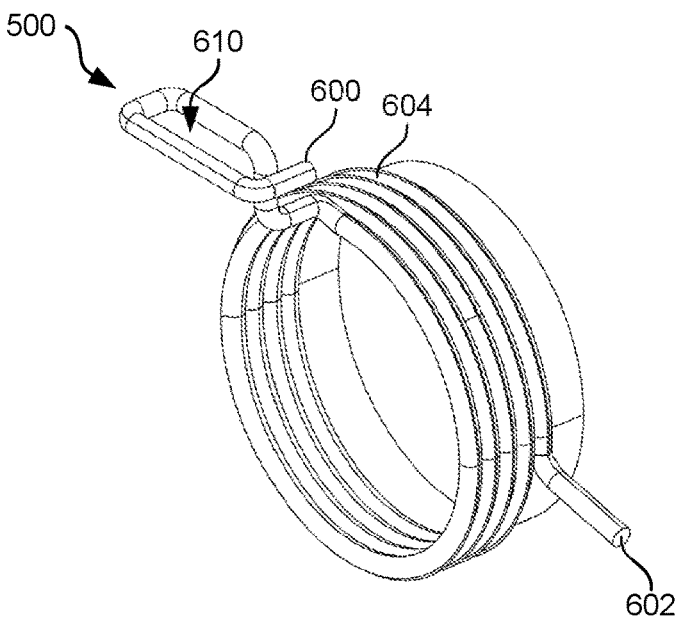
FIGS. 8A and 8B illustrate the spring of FIGS. 6A and 6B, according to examples of the present disclosure.
Figure 8B:
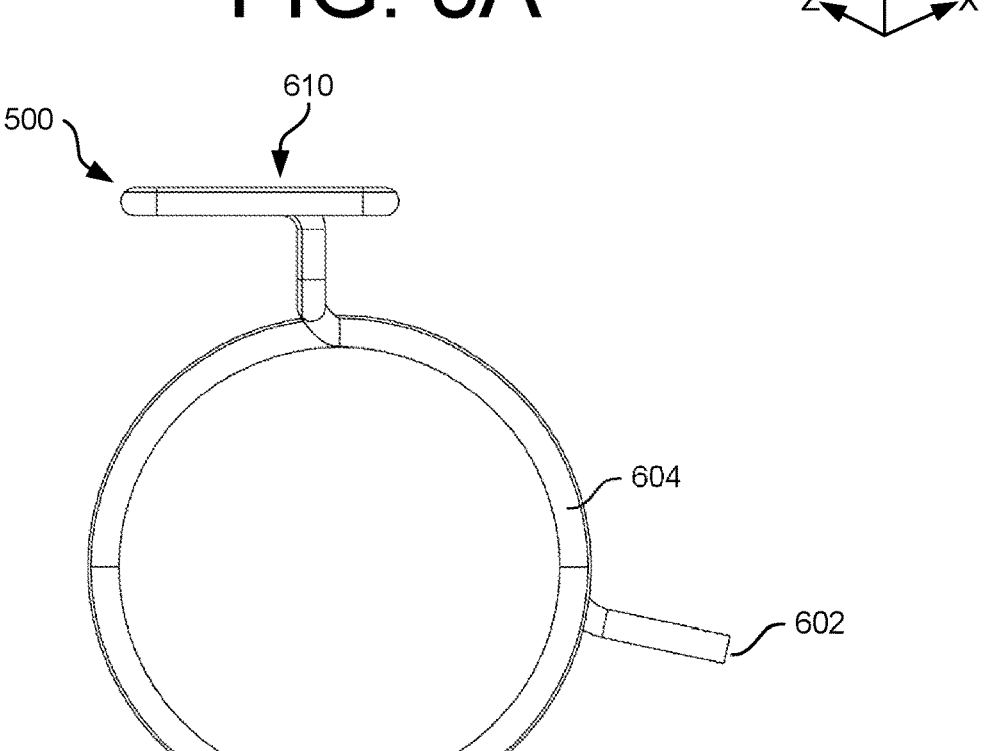
Figure 8B:
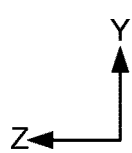

FIGS. 8A and 8B illustrate the spring 500, according to examples of the present disclosure. As introduced above, the spring 500 may include the first end 600 and the second end 602. The first end 600 may represent a stationary end of the spring 500 while the second end 602 may represent a rotating end of the spring 500. The first end 600 may be disposed in the receptacle 608 of the housing 510 and the second end 602 may be disposed in the notch 702 of the bracket 300. The coils 604 may be located between the first end 600 and the second end 602, and the coils 604 may be sized to be received within the channel 512 of the bracket 300. The spring 500 may include any number of the coils 604.

The spring 500 also includes the loop 610, which may be disposed more proximate to the first end 600 as compared to the second end 602. In some instances, the coils 604 may be disposed along a first plane (e.g., Y-Z), while the loop may be disposed along a second plane (e.g., X-Z) plane. The loop 610 may be at least partially disposed around, or engaged with, the flange 606 of the housing 510. The engagement between the first end 600 within the opening, and/or the engagement between the loop 610 and the flange 606, may prevent the first end 600 moving while the spring 500 is wound and unwound. The spring 500 may also include other bends, curves, etc. between the first end 600 and the second end 602 for routing around components of the stand 102.

Figure 9A:
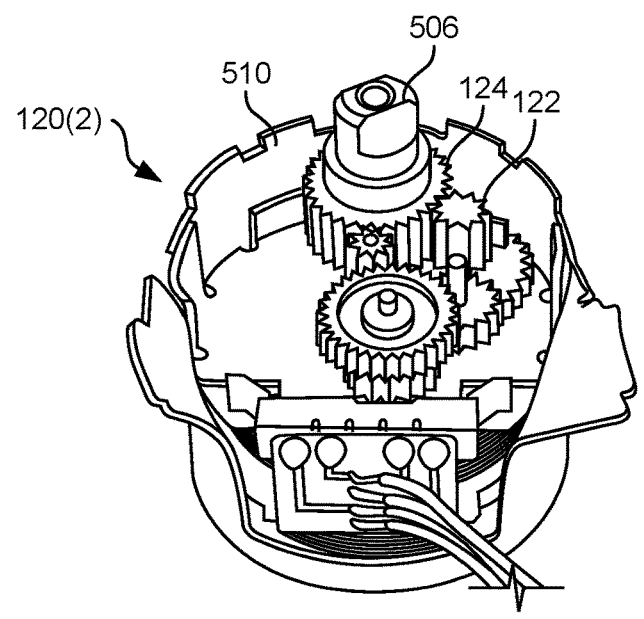
FIGS. 9A and 9B illustrate details of the motor of FIGS. 6A and 6B, according to examples of the present disclosure.
Figure 9A:
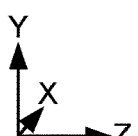
Figure 9B:
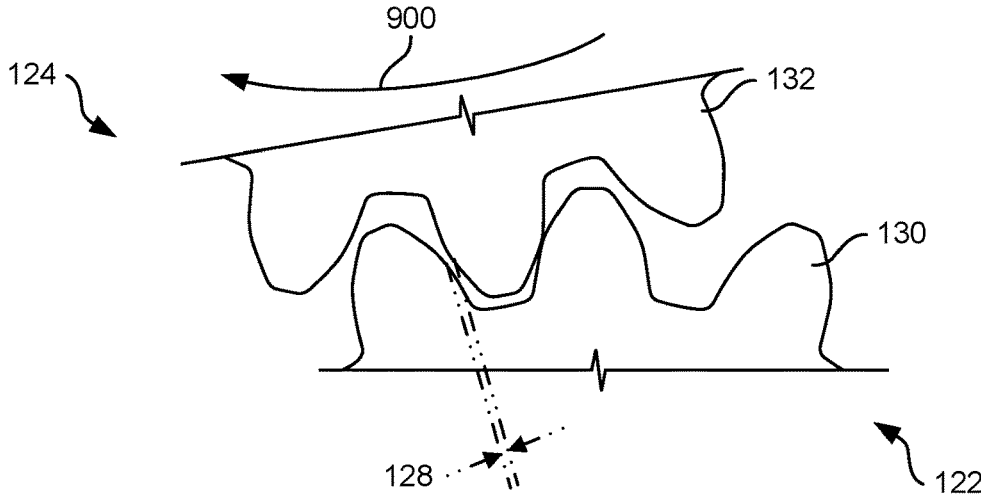
Figure 9B:
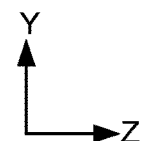

FIGS. 9A and 9B illustrate details of the second motor 120(2), according to examples of the present disclosure. The second motor 120(2) may include any number of gears for powering the shaft 506, which extends external to the housing 510 to engage with the bracket 300. As introduced above with regard to FIG. 1, the stand 102 includes the spring 500 to reduce backlash between two mating gears, such as the first gear 122 and the second gear 124. The second gear 124 may be coupled to the shaft 506, and may be driven by the first gear 122.

For example, the first gear 122 may rotate in the first rotational direction 204 (e.g., clockwise about the rotational axis 208). When the second motor 120(2) is no longer powered, the backlash 128 may exist between the first teeth 130 and the second teeth 132, for example. Upon actuating the second motor 120(2), the backlash 128 may cause jitter, jerking, jarring, etc. However, the spring 500 may apply a force 900 that is opposite to the first rotational direction 204, thereby reducing or eliminating the backlash 128. While the backlash 128 is described with relation to the first gear 122 and the second gear 124, the force 900 may be propagated throughout other gears of the second motor 120(2) to reduce, or eliminate, backlash between other gears.

Figure 10:
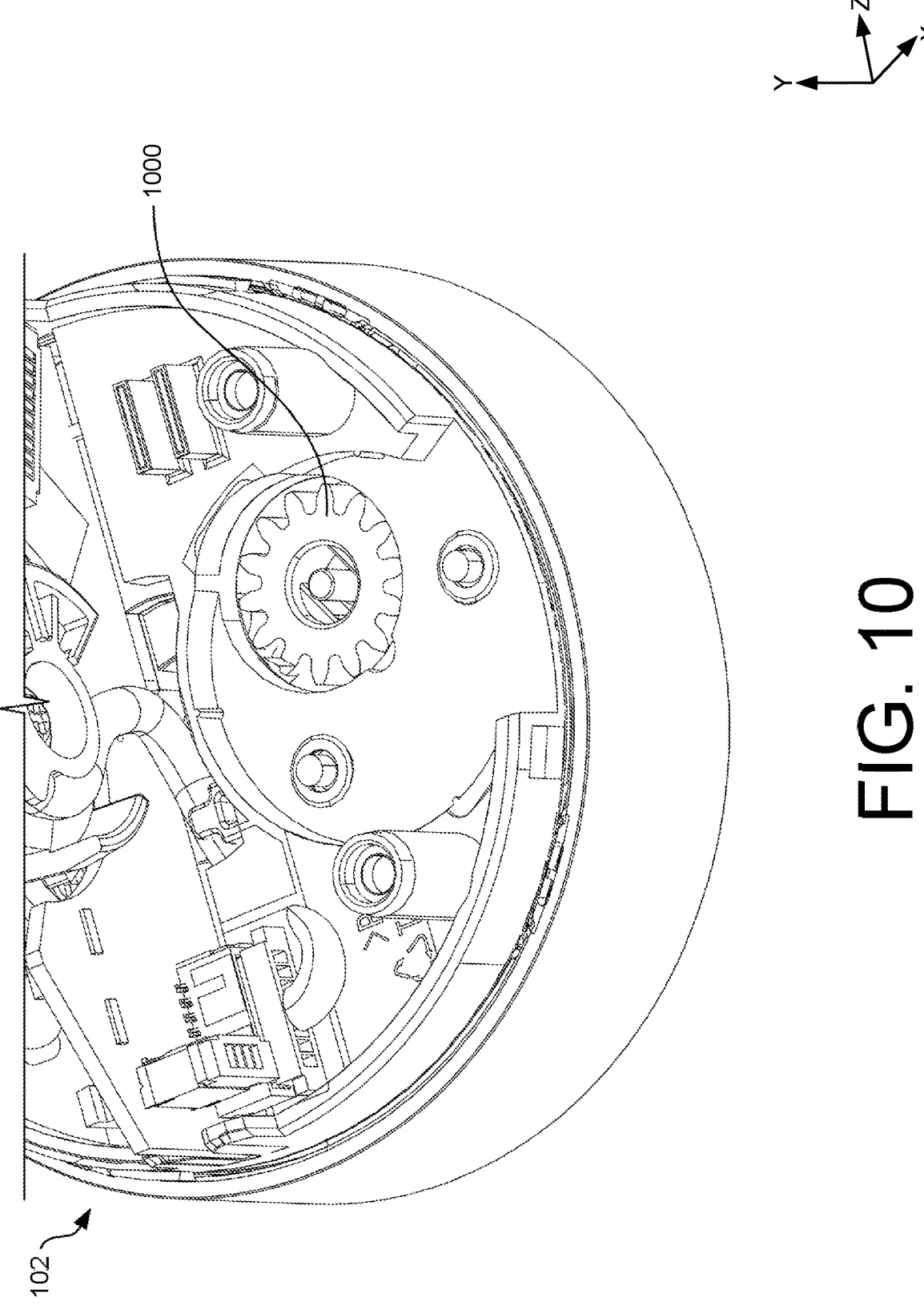
FIG. 10 illustrate example components of the stand of FIG. 1 for adjusting the FoV of the one or more sensor(s) of the device, according to examples of the present disclosure.

FIG. 10 illustrates details of the stand 102, showing a gear 1000 that is powered via the first motor 120(1) for adjusting the pan of the stand 102. For example, a shaft of the first motor 120(1) may couple to the gear 1000 for actuating the gear 1000 and causing the second portion 114 to rotate relative to the second portion 114. The gear 1000 may be disposed in first portion 112, and the first portion 112 may include additional gears, arms, levers, etc. for transferring motion of the gear 1000 to rotation of the second portion 114.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A stand comprising:
a first portion; and
a second portion including:
   a bracket at least partially disposed within the second portion, the bracket having a channel,
   a neck at least partially disposed within the second portion, the neck having a first end coupled to the bracket and a second end coupled to a device,
   a first motor at least partially disposed with the second portion,
   a second motor at least partially disposed within the second portion, the second motor having:
   a housing, and
   a shaft coupled to the bracket, and
   a spring having a first end coupled to the housing of the second motor and a second end operably coupled to the bracket, the spring being at least partially disposed within the channel and configured to at least partially reduce a backlash of gears within the second motor.

2. The stand of claim 1, wherein:
the first motor adjusts a pan of the device; and
the second motor adjusts a tilt of the device.

3. The stand of claim 1, wherein:
the first portion is configured to remain stationary during panning of the device; and
the second portion is configured to rotate during panning of the device.

4. The stand of claim 1, further comprising:
one or more processors; and
one or more non-transitory computer-readable media storing computer-executable instructions that, when executed by the one or more processors, cause the one or more processors to perform acts comprising:
   receiving a signal associated with actuating at least one of the first motor or the second motor, and
   causing, based at least in part on the signal, the at least one of the first motor or the second motor to actuate.

5. The stand of claim 1, wherein:
the housing includes a flange having an opening;
the first end is disposed at least partially within the opening of the housing;
the second end disposed at least partially within a notch of the bracket, the notch being connected to the channel; and
the spring includes a loop disposed proximate to the first end of the spring, the spring being at least partially disposed around the flange of the housing.

6. A device comprising:
a mount for coupling to an electronic device having a camera;
a first motor configured to actuate in a first direction for adjusting a field of view (FoV) of the camera;
a second motor configured to actuate in a second direction, different than the first direction, for adjusting the FoV of the camera;
a bracket coupled to the second motor and the mount; and
a spring at least partially disposed within the bracket and configured to reduce a backlash within one or more gears of the second motor.

7. The device of claim 6, wherein:
the first motor is configured to adjust a pan of the device; and
the second motor is configured to adjust a tilt of the device.

8. The device of claim 6, wherein:
the second motor includes a housing; and
the spring at least partially couples to the housing.

9. The device of claim 8, wherein:
the housing includes a flange having an opening; and
the spring includes:
   a first end disposed in the opening for coupling the spring to the housing; and
   a second end configured to rotate during actuation of the second motor.

10. The device of claim 6, wherein:
the bracket defines a channel; and
one or more coils of the spring are disposed within the channel.

11. The device of claim 6, wherein:
the second motor includes a shaft having a rotational axis;
rotation of the shaft in a first direction via actuation of the second motor causes the spring to generate a first force in a second direction that is opposite the first direction; and rotation of the shaft in a third direction via actuation of the second motor causes the spring to generate a second force in a fourth direction that is opposite the third direction.

12. The device of claim 6, further comprising:

one or more processors; and one or more non-transitory computer-readable media storing computer-executable instructions that, when executed by the one or more processors, cause the one or more processors to perform acts comprising:

receiving a signal associated with actuating at least one of the first motor or the second motor, and causing, based at least in part on the signal, the at least one of the first motor or the second motor to actuate.

13. The device of claim 6, wherein:

the first motor has a first rotational axis; and the second motor has a second rotational axis that is orthogonal to the first rotational axis.

14. The device of claim 6, further comprising:

a first housing; and a second housing defining a slot in which the mount is configured to translate, wherein the second housing is configured to rotate relative to the first housing.

15. An apparatus comprising:

a motor including:

one or more gears, and a shaft operably coupled to the one or more gears, the shaft being configured to actuate to adjust a field of view (FoV) of a camera;

a bracket including:

a passage in which the shaft is at least partially disposed, and a channel; and a spring at least partially disposed with the channel of the bracket, the spring being configured to reduce a backlash within the one or more gears of the motor.

16. The apparatus of claim 15, wherein:

the motor includes a housing;

the spring includes:

a first end coupled to the housing, a second end opposite the first end, and one or more coils disposed between the first end and the second end;

the bracket includes a notch connected to the channel;

the one or more coils are at least partially disposed within the channel; and the second end is at least partially disposed within the notch.

17. The apparatus of claim 16, wherein:

the housing includes a flange having an opening;

the first end of the spring is at least partially disposed within the opening; and the spring includes a loop that is at least partially disposed around the flange.

18. The apparatus of claim 15, further comprising a second motor including a second shaft, the second shaft being configured to actuate to adjust the FoV of the camera.

19. The apparatus of claim 18, wherein:

the shaft is configured to actuate in a first direction to adjust the FoV of the camera; and the second shaft is configured to actuate in a second direction, different than the first direction, to adjust the FoV of the camera.

20. The apparatus of claim 15, wherein the bracket couples to an electronic device including the camera.

\* \* \* \* \*